(12) United States Patent
Kawamura et al.

(10) Patent No.: US 8,723,991 B2
(45) Date of Patent: May 13, 2014

(54) COLOR IMAGING ELEMENT, IMAGING DEVICE, AND STORAGE MEDIUM STORING AN IMAGING PROGRAM

(71) Applicant: FUJIFILM Corporation, Tokyo (JP)

(72) Inventors: Noriko Kawamura, Saitama (JP); Kazuki Inoue, Saitama (JP); Hiroshi Endo, Saitama (JP); Takashi Aoki, Saitama (JP); Seiji Tanaka, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/031,822

(22) Filed: Sep. 19, 2013

(65) Prior Publication Data

US 2014/0043508 A1 Feb. 13, 2014

Related U.S. Application Data

(63) Continuation of application No. PCT/JP2011/067546, filed on Jul. 29, 2011.

(30) Foreign Application Priority Data

Mar. 24, 2011 (JP) .................. 2011-066629
Jul. 26, 2011 (JP) .................. 2011-163308

(51) Int. Cl.
*H04N 9/07* (2006.01)
*H04N 3/14* (2006.01)
*H04N 9/083* (2006.01)

(52) U.S. Cl.
USPC .......................... 348/266; 348/272; 348/280

(58) Field of Classification Search
None
See application file for complete search history.

(56) References Cited

U.S. PATENT DOCUMENTS 6,343,146 B1 1/2002 Tsuruoka et al.
6,995,796 B2 2/2006 Taubman
(Continued)

FOREIGN PATENT DOCUMENTS

JP 08-23542 A 1/1996
JP 08-23543 A 1/1996
(Continued)

OTHER PUBLICATIONS

Chinese Notification of the First Office Action—201180022503.3 Issued on May 23, 2013.

(Continued)

*Primary Examiner* — Lin Ye
*Assistant Examiner* — Euel Cowan
(74) *Attorney, Agent, or Firm* — Birch, Stewart, Kolasch & Birch, LLP

(57) ABSTRACT

An image pickup device includes: a color filter having basic array patterns with first and second array patterns disposed symmetrically, wherein the first array pattern has a first filter at the 4 corner and center pixels of a 3×3 pixel square array, a second filter in a line at the horizontal direction center of the square array, and a third filter placed in a line at the vertical direction center of the square array, and the second array pattern has the same placement of the first filter as the first array pattern and has placement of the second filter and placement of the third filter swapped to that of the first array pattern; and phase difference detection pixels placed on pixels corresponding to positions of centers of at least 1 pair of patterns out of 2 pairs of the first array pattern and the second array pattern.

22 Claims, 17 Drawing Sheets

(56) References Cited

U.S. PATENT DOCUMENTS

| | | | |
|---|---|---|---|
| 7,283,663 B2 * | 10/2007 | Sobel et al. | 382/162 |
| 2002/0149686 A1 | 10/2002 | Taubman | |
| 2004/0109068 A1 * | 6/2004 | Mitsunaga et al. | 348/222.1 |
| 2004/0169747 A1 | 9/2004 | Ono et al. | |
| 2006/0203113 A1 | 9/2006 | Wada et al. | |
| 2007/0153104 A1 | 7/2007 | Ellis-Monaghan et al. | |
| 2008/0131028 A1 | 6/2008 | Pillman et al. | |
| 2008/0151083 A1 * | 6/2008 | Hains et al. | 348/273 |
| 2011/0069189 A1 | 3/2011 | Venkataraman et al. | |
| 2012/0025060 A1 | 2/2012 | Iwata | |

FOREIGN PATENT DOCUMENTS

| | | | |
|---|---|---|---|
| JP | 10-243407 A | 9/1998 | |
| JP | 11-285012 A | 10/1999 | |
| JP | 2000-156823 A | 6/2000 | |
| JP | 2000-308080 A | 11/2000 | |
| JP | 2004-221839 A | 8/2004 | |
| JP | 2004-266369 A | 9/2004 | |
| JP | 3592147 B2 | 11/2004 | |
| JP | 2005-136766 A | 5/2005 | |
| JP | 2007-155929 A | 6/2007 | |
| JP | 2007-184904 A | 7/2007 | |
| JP | 2007-306490 A | 11/2007 | |
| JP | 2008-236620 A | 10/2008 | |
| JP | 2008-312073 A | 12/2008 | |
| JP | 2009-089144 A | 4/2009 | |
| JP | 2009-105682 A | 5/2009 | |
| JP | 2010-066494 A | 3/2010 | |
| JP | 2010-512048 A | 4/2010 | |
| JP | 2010-153511 A | 7/2010 | |
| JP | 2011-523538 A | 8/2011 | |
| WO | WO02/056604 A1 | 7/2002 | |
| WO | WO 2008/066698 A2 | 6/2008 | |
| WO | WO 2009/151903 A2 | 12/2009 | |

OTHER PUBLICATIONS

International Search Report for PCT/JP2011/067546 dated Sep. 6, 2011.

Written Opinion of the International Searching Authority Issued in PCT/JP2011/067546 dated Sep. 6, 2011.

Written Opinion of the International Searching Authority Issued in PCT/JP2012/080898 dated Jan. 22, 2013.

Written Opinion of the International Searching Authority Issued in PCT/JP2012/080899 dated Jan. 15, 2013.

Written Opinion of the International Searching Authority Issued in PCT/JP2012/081644 dated Jan. 15, 2013.

Written Opinion of the International Searching Authority Issued in PCT/JP2012/083583 dated Jan. 29, 2013.

* cited by examiner

| G00 | G10 | R20 | G30 | G40 |
|-----|-----|-----|-----|-----|
| G01 | G11 | B21 | G31 | G41 |
| B02 | R12 | G22 | R32 | B42 |
| G03 | G13 | B23 | G33 | G43 |
| G04 | G14 | R24 | G34 | G44 |

|    | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|----|---|---|---|---|---|---|---|---|---|----|----|----|----|----|----|----|----|----|----|----|----|----|----|----|
| 1  | G | R | G | G | B | G | G | R | G | G  | B  | G  | G  | R  | G  | G  | B  | G  | G  | R  | G  | G  | B  | G  |
| 2  | B | G | B | R | G | R | B | G | B | R  | G  | R  | B  | G  | B  | R  | G  | R  | B  | G  | B  | R  | G  | R  |
| 3  | G | R | G | G | B | G | G | R | G | G  | B  | G  | G  | R  | G  | G  | B  | G  | G  | R  | G  | G  | B  | G  |
| 4  | G | B | G | G | R | G | G | B | G | G  | R  | G  | G  | B  | G  | G  | R  | G  | G  | B  | G  | G  | R  | G  |
| 5  | R | G | R | B | G | B | R | G | R | B  | G  | B  | R  | G  | R  | B  | G  | B  | R  | G  | R  | B  | G  | B  |
| 6  | G | B | G | G | R | G | G | B | G | G  | R  | G  | G  | B  | G  | G  | R  | G  | G  | B  | G  | G  | R  | G  |
| 7  | G | R | G | G | B | G | G | R | G | G  | B  | G  | G  | R  | G  | G  | B  | G  | G  | R  | G  | G  | B  | G  |
| 8  | B | G | B | R | G | R | B | G | B | R  | G  | R  | B  | G  | B  | R  | G  | R  | B  | G  | B  | R  | G  | R  |
| 9  | G | R | G | G | B | G | G | R | G | G  | B  | G  | G  | R  | G  | G  | B  | G  | G  | R  | G  | G  | B  | G  |
| 10 | G | B | G | G | R | G | G | B | G | G  | R  | G  | G  | B  | G  | G  | R  | G  | G  | B  | G  | G  | R  | G  |
| 11 | R | G | R | B | G | B | R | G | R | B  | G  | B  | R  | G  | R  | B  | G  | B  | R  | G  | R  | B  | G  | B  |
| 12 | G | B | G | G | R | G | G | B | G | G  | R  | G  | G  | B  | G  | G  | R  | G  | G  | B  | G  | G  | R  | G  |
| 13 | G | R | G | G | B | G | G | R | G | G  | B  | G  | G  | R  | G  | G  | B  | G  | G  | R  | G  | G  | B  | G  |
| 14 | B | G | B | R | G | R | B | G | B | R  | G  | R  | B  | G  | B  | R  | G  | R  | B  | G  | B  | R  | G  | R  |
| 15 | G | R | G | G | B | G | G | R | G | G  | B  | G  | G  | R  | G  | G  | B  | G  | G  | R  | G  | G  | B  | G  |
| 16 | G | B | G | G | R | G | G | B | G | G  | R  | G  | G  | B  | G  | G  | R  | G  | G  | B  | G  | G  | R  | G  |
| 17 | R | G | R | B | G | B | R | G | R | B  | G  | B  | R  | G  | R  | B  | G  | B  | R  | G  | R  | B  | G  | B  |
| 18 | G | B | G | G | R | G | G | B | G | G  | R  | G  | G  | B  | G  | G  | R  | G  | G  | B  | G  | G  | R  | G  |
| 19 | G | R | G | G | B | G | G | R | G | G  | B  | G  | G  | R  | G  | G  | B  | G  | G  | R  | G  | G  | B  | G  |
| 20 | B | G | B | R | G | R | B | G | B | R  | G  | R  | B  | G  | B  | R  | G  | R  | B  | G  | B  | R  | G  | R  |
| 21 | G | R | G | G | B | G | G | R | G | G  | B  | G  | G  | R  | G  | G  | B  | G  | G  | R  | G  | G  | B  | G  |
| 22 | G | B | G | G | R | G | G | B | G | G  | R  | G  | G  | B  | G  | G  | R  | G  | G  | B  | G  | G  | R  | G  |
| 23 | R | G | R | B | G | B | R | G | R | B  | G  | B  | R  | G  | R  | B  | G  | B  | R  | G  | R  | B  | G  | B  |
| 24 | G | B | G | G | R | G | G | B | G | G  | R  | G  | G  | B  | G  | G  | R  | G  | G  | B  | G  | G  | R  | G  |

40B and 40A labels point to columns 3 and 5 at row 2.

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | G | R | G | G | B | G | G | R | G | G | B | G | G | R | G | G | B | G | G | R | G | G | B | G |
| 2 | B | G | B | R | G | R | B | G | B | R | G | R | B | G | B | R | G | R | B | G | B | R | G | R |
| 3 | G | R | G | G | B | G | G | R | G | G | B | G | G | R | G | G | B | G | G | R | G | G | B | G |
| 4 | G | B | G | G | R | G | G | B | G | G | R | G | G | B | G | G | R | G | G | B | G | G | R | G |
| 5 | R | G | R | B | G | B | R | G | R | B | G | B | R | G | R | B | G | B | R | G | R | B | G | B |
| 6 | G | B | G | G | R | G | G | B | G | G | R | G | G | B | G | G | R | G | G | B | G | G | R | G |
| 7 | G | R | G | G | B | G | G | R | G | G | B | G | G | R | G | G | B | G | G | R | G | G | B | G |
| 8 | B | G | B | R | G | R | B | G | B | R | G | R | B | G | B | R | G | R | B | G | B | R | G | R |
| 9 | G | R | G | G | B | G | G | R | G | G | B | G | G | R | G | G | B | G | G | R | G | G | B | G |
| 10 | G | B | G | G | R | G | G | B | G | G | R | G | G | B | G | G | R | G | G | B | G | G | R | G |
| 11 | R | G | R | B | G | B | R | G | R | B | G | B | R | G | R | B | G | B | R | G | R | B | G | B |
| 12 | G | B | G | G | R | G | G | B | G | G | R | G | G | B | G | G | R | G | G | B | G | G | R | G |
| 13 | G | R | G | G | B | G | G | R | G | G | B | G | G | R | G | G | B | G | G | R | G | G | B | G |
| 14 | B | G | B | R | G | R | B | G | B | R | G | R | B | G | B | R | G | R | B | G | B | R | G | R |
| 15 | G | R | G | G | B | G | G | R | G | G | B | G | G | R | G | G | B | G | G | R | G | G | B | G |
| 16 | G | B | G | G | R | G | G | B | G | G | R | G | G | B | G | G | R | G | G | B | G | G | R | G |
| 17 | R | G | R | B | G | B | R | G | R | B | G | B | R | G | R | B | G | B | R | G | R | B | G | B |
| 18 | G | B | G | G | R | G | G | B | G | G | R | G | G | B | G | G | R | G | G | B | G | G | R | G |
| 19 | G | R | G | G | B | G | G | R | G | G | B | G | G | R | G | G | B | G | G | R | G | G | B | G |
| 20 | B | G | B | R | G | R | B | G | B | R | G | R | B | G | B | R | G | R | B | G | B | R | G | R |
| 21 | G | R | G | G | B | G | G | R | G | G | B | G | G | R | G | G | B | G | G | R | G | G | B | G |
| 22 | G | B | G | G | R | G | G | B | G | G | R | G | G | B | G | G | R | G | G | B | G | G | R | G |
| 23 | R | G | R | B | G | B | R | G | R | B | G | B | R | G | R | B | G | B | R | G | R | B | G | B |
| 24 | G | B | G | G | R | G | G | B | G | G | R | G | G | B | G | G | R | G | G | B | G | G | R | G |

| G2 |    | G3 |
|----|----|----|
|    | G1 |    |
| G5 |    | G4 |

COLOR IMAGING ELEMENT, IMAGING DEVICE, AND STORAGE MEDIUM STORING AN IMAGING PROGRAM

CROSS-REFERENCE TO RELATED APPLICATIONS

This application is a continuation application of International Application No. PCT/JP2011/067546, filed Jul. 29, 2011, the disclosure of which is incorporated herein by reference in its entirety. Further, this application claims priority from Japanese Patent Application No. 2011-066629, filed Mar. 24, 2011, and Japanese Patent Application No. 2011-163308, filed Jul. 26, 2011.

BACKGROUND

1. Technical Field

The present invention relates to a color image pickup device, an imaging apparatus and an image capture program, and in particular to a color image pickup device that includes phase difference detection pixels and to an imaging apparatus and an image capture program of the same.

2. Related Art

For solid state image pickup devices installed in imaging apparatuses such as digital cameras, there are those that, in order to raise Auto Focus (AF) performance have phase difference detection pixels as a portion of the pixels out of many pixels formed on the solid state image pickup device light receiving surface (see for example Patent Documents 1 to 7).

The phase difference detection pixels are, for example as in the Patent Documents 1 to 7 listed below, configured by 2 nearby pixels mounted with the same color filter to form pairs, and are provided with light-blocking film openings that are respectively smaller than the light-blocking film openings provided to normal pixels. Moreover, the light-blocking film opening provided to one of the phase difference detection pixels configuring a pair is provided eccentrically in a separation direction (for example on the left side) from the other phase difference detection pixel, and the light-blocking film opening of the other phase difference detection pixel is provided eccentrically in the opposite direction (for example on the right side).

During AF operation in an imaging apparatus, the signals are read from the phase difference detection pixels of the solid state image pickup device, a focal point shift amount is derived from the detection signal of the pixel with light-blocking film opening eccentrically placed on the right side, and the detection signal of the pixel with the light-blocking film opening eccentrically placed on the left side, and the focal position of the imaging lens is adjusted.

The precision of such AF operation is higher the more there are of the phase difference detection pixels, however during main image capture of a normal subject image, the phase difference detection pixels have narrower light-blocking film openings and lower sensitivity, and hence there is the issue that they cannot be treated in the same way as normal pixels.

Accordingly, during reading out signals from all the pixels and generating a subject image, there is a need to gain correct detection signals from the phase difference detection pixels to a similar level to the sensitivity of the normal pixels, or to treat the phase difference detection pixels as missing pixels and to perform interpolation computation correction using the detection signals of peripheral normal pixels.

PATENT DOCUMENTS

Patent Document 1 Japanese Patent Application Laid-Open (JP-A) No. 2000-156823
Patent Document 2 JP-A No. 2007-155929
Patent Document 3 JP-A No. 2009-89144
Patent Document 4 JP-A No. 2009-105682
Patent Document 5 JP-A No. 2010-66494
Patent Document 6 JP-A No. 2008-312073
Patent Document 7 Japanese Patent No. 3592147

With phase difference detection pixels, in cases in which interpolation computation correction is performed with detection signals of peripheral normal pixels, sometimes there is a deterioration in the precision of interpolation and a deterioration in image quality depending on the position of the phase difference detection pixels.

SUMMARY

The present invention addresses the above issue, and an object thereof is to provide a color image pickup device, an imaging apparatus and an image capture program capable of raising the interpolation precision of phase difference detection pixels.

In order to address the above issue, a color image pickup device of the present invention includes: an image pickup device including plural photoelectric conversion elements arrayed in a horizontal direction and a vertical direction; a color filter that is provided above plural pixels configured by the plural photoelectric conversion elements, the color filter having repeatedly disposed 6×6 pixel basic array patterns configured with a first array pattern and a second array pattern disposed symmetrically about a point, wherein the first array pattern has a first filter corresponding to a first color that contributes most to obtaining a brightness signal placed at the 4 corner and center pixels of a 3×3 pixel square array, a second filter corresponding to a second color different from the first color placed in a line at the horizontal direction center of the square array, and a third filter corresponding to a third color different from the first color and the second color placed in a line at the vertical direction center of the square array, and the second array pattern has the same placement of the first filter as that in the first array pattern and has the placement of the second filter and the placement of the third filter swapped over to that of the first array pattern; and phase difference detection pixels that are placed on the pixels corresponding to the positions of the centers of at least 1 pair of patterns out of 2 pairs of the first array pattern and the second array pattern configuring the basic array pattern.

According to the present invention, the interpolation precision of phase difference detection pixels can be raised due to configuration including the phase difference detection pixels that are placed on the pixels corresponding to the positions of the centers of at least 1 pair of patterns out of 2 pairs of the first array pattern and the second array pattern configuring the basic array pattern.

Note that, configuration may be made such that a light-blocking section is provided on the phase difference detection pixels, the light-blocking section including a first light-blocking film to block light to a region that is a part of the pixel and to let light through to other regions or a second light-blocking film to block light to part of the pixel and to let light pass through in a region that forms a pair with the light-pass region of the first light-blocking film.

Moreover, configuration may be made such that the first light-blocking film of the light-blocking section blocks light to a pixel horizontal direction left half region, and the second light-blocking film blocks light to a pixel horizontal direction right half region.

Moreover, configuration may be made such that the phase difference detection pixels are respectively provided to pixels corresponding to the positions of the centers of the 2 pairs of the first array pattern and the second array pattern, and the phase difference detection pixels are placed on pixels corresponding to the positions of the centers of all the basic array patterns in at least a specific region of the image pickup device.

Moreover, configuration may be made such that the phase difference detection pixels are respectively provided to pixels corresponding to the positions of the centers of the 2 pairs of the first array pattern and the second array pattern, and horizontal direction array lines disposed with the first array patterns and the second array patterns that are placed with the phase difference detection pixels are alternately arrayed in the vertical direction with horizontal direction array lines disposed with the first array patterns and the second array patterns that are not placed with the phase difference detection pixels.

Moreover, configuration may be made such that the phase difference detection pixels are respectively provided to pixels corresponding to the positions of the centers of 1 pair of the first array pattern and the second array pattern on one horizontal direction side of the 2 pairs of the first array pattern and the second array pattern, and horizontal direction array lines disposed with the first array patterns and the second array patterns that are placed with the phase difference detection pixels are alternately arrayed in the vertical direction with horizontal direction array lines disposed with the first array patterns and the second array patterns that are not placed with the phase difference detection pixels.

Moreover, configuration may be made such that the phase difference detection pixels are respectively provided to pixels corresponding to the positions of the centers of 2 array patterns disposed on one of the diagonals out of the 2 first array patterns disposed on one diagonal of the basic array pattern and the 2 second array patterns disposed on the other diagonal of the basic array pattern, and are placed on pixels corresponding to the positions of the centers of all the basic array patterns in at least a specific region of the image pickup device.

Moreover, configuration may be made such that the phase difference detection pixels are respectively provided to pixels corresponding to the positions of the centers of 2 array patterns disposed on one of the diagonals out of the 2 first array patterns disposed on one diagonal of the basic array pattern and the 2 second array patterns disposed on the other diagonal of the basic array pattern, and horizontal direction array lines disposed with the basic array patterns that are placed with the phase difference detection pixels are alternately arrayed in the vertical direction with horizontal direction array lines disposed with the basic array patterns that are not placed with the phase difference detection pixels.

Moreover, configuration may be made such that array lines disposed in the horizontal direction with the first light-blocking film are alternately arrayed in the vertical direction with array lines disposed in the horizontal direction with the second light-blocking film.

Moreover, configuration may be made such that array lines alternately disposed in the horizontal direction in sequence with the first light-blocking film and the second light-blocking film are alternately arrayed in the vertical direction with array lines alternately disposed in the horizontal direction in sequence with the second light-blocking film and the first light-blocking film.

Moreover, configuration may be made such that: the first color is green (G), the second color is red (R), and the third color is blue (B); and the light-blocking section is disposed such that the pixel on the horizontal direction left side of the first light-blocking film and the pixel on the horizontal direction right side of the second light-blocking film are both red (R) color pixels.

Moreover, configuration may be made such that the first color is green (G), the second color is one color of red (R) or blue (B), and the third color is the other color of red (R) or blue (B).

An imaging apparatus of the present invention includes: the color image pickup device; a drive section that drives the color image pickup device so as to read phase difference detection pixel data from the phase difference detection pixels; and a focus adjustment section that adjusts focus based on the phase difference detection pixel data.

An imaging apparatus of the present invention includes: the color image pickup device; a drive section that drives the color image pickup device so as to read phase difference detection pixel data from the phase difference detection pixels and so as to read video generation pixel data from normal pixels other than the phase difference detection pixels; a focus adjustment section that adjusts focus based on the phase difference detection pixel data; and a generation section that generates video data based on the video generation pixel data.

An imaging apparatus of the present invention includes: the color image pickup device; a drive section that drives the color image pickup device so as to read pixel data of direction determination pixels placed with a 2×2 first filter at the center of the basic array pattern; a detection section that detects a brightness correlation direction based on the pixel data read from the direction determination pixels; and an interpolation section that, based on the detected correlation direction, interpolates pixel data of a color other than the corresponding color for each pixel from pixel data of peripheral pixels.

An image capture program of the present invention causes a computer to function as each section configuring the imaging apparatus.

Advantageous Effects of Invention

According to the present invention, the advantageous effect is exhibited of enabling the interpolation precision of phase difference detection pixels to be raised.

BRIEF DESCRIPTION OF DRAWINGS

FIG. 3 is a diagram illustrating light-blocking portion placement according to a first exemplary embodiment.

FIG. 6 is a diagram for explaining a brightness correlation direction determination method and a pixel interpolation method during synchronization processing.

FIG. 9 is a diagram illustrating light-blocking portion placement according to a second exemplary embodiment.

FIG. 10 is a diagram illustrating light-blocking portion placement according to a third exemplary embodiment.

FIG. 11 is a diagram illustrating light-blocking portion placement according to a fourth exemplary embodiment.

FIG. 12 is a diagram illustrating light-blocking portion placement according to a fourth exemplary embodiment.

FIG. 13 is a diagram illustrating light-blocking portion placement according to a fifth exemplary embodiment.

FIG. 14 is a diagram illustrating light-blocking portion placement according to the fifth exemplary embodiment.

FIG. 17 is a diagram to explain a case in which pixel data of phase difference detection pixels is corrected by average value correction.

DESCRIPTION OF EMBODIMENTS

Explanation follows regarding exemplary embodiments of the present invention, with reference to the drawings.

First Exemplary Embodiment

Figure 1:
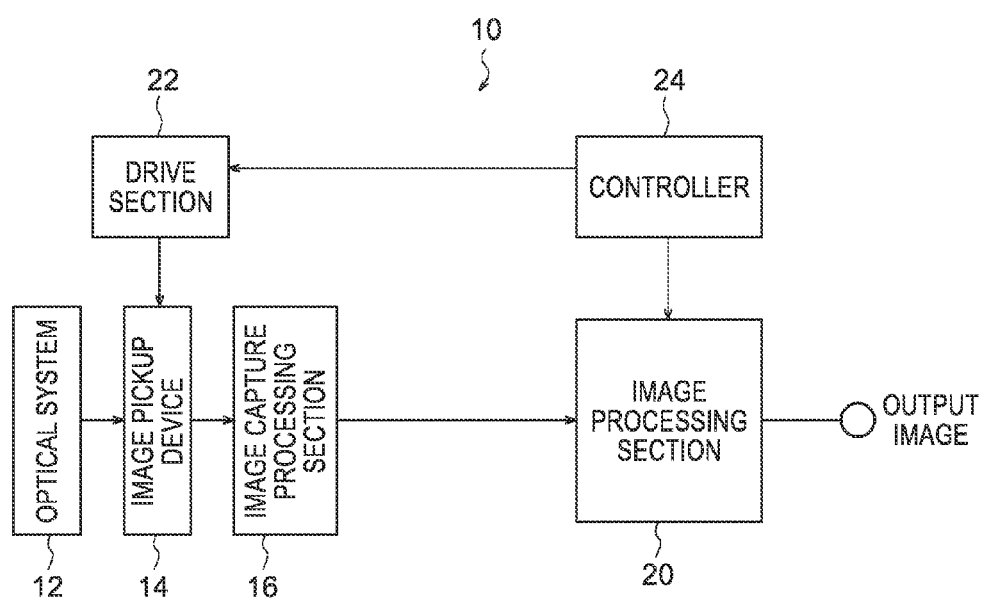
FIG. 1 is a schematic block diagram of an imaging apparatus.

FIG. 1 is a schematic block diagram illustrating an imaging apparatus 10 according to the present exemplary embodiment. The imaging apparatus 10 is configured including an optical system 12, an image pickup device 14, an image capture processing section 16, an image processing section 20, a drive section 22, and a controller 24.

The optical system 12 is configured including for example a lens set configured from plural optical lenses, an aperture adjustment mechanism, a zoom mechanism, and an automatic focusing mechanism.

The image pickup device 14 is what is referred to as a 1-chip image pickup device configured by an image pickup device, such as for example a Charge Coupled Device (CCD) or a Complementary Metal Oxide Semiconductor (CMOS) containing plural photoelectric conversion elements arrayed in the horizontal direction and vertical direction, with a color filter disposed above the image pickup device.

Figure 2:
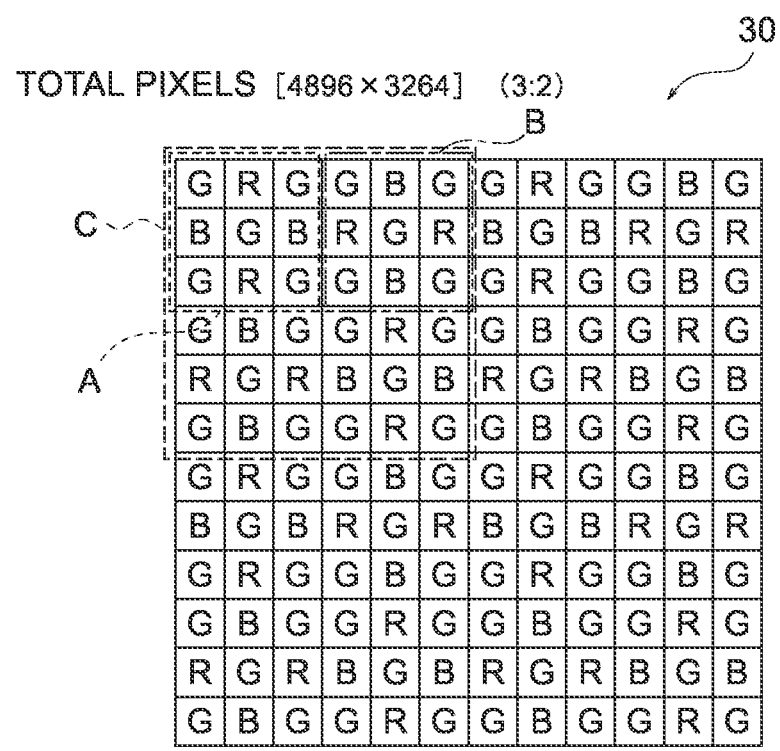
FIG. 2 is a configuration diagram of a color filter according to the present invention.

FIG. 2 illustrates a portion of a color filter 30 according to the present invention. Note that (4896×3264) pixels are provided as an example of the number of pixels with an aspect ratio of 3:2, however there is no limitation to such a number of pixels and aspect ratio. As illustrated in FIG. 2, the color filter 30 is a color filter having a repeatedly disposed 6×6 pixel basic array pattern C configured with a first array pattern A and a second array pattern B disposed symmetrically about a point, wherein the first array pattern A has a first filter G (referred to below as G filter) corresponding to G (green) that contributes most to obtaining a brightness signal placed at the 4 corner and center pixels of a 3×3 pixel square array, a second filter R (referred to below as R filter) corresponding to R (red) placed in the line at the horizontal direction center of the square array, and a third filter B (referred to below as B filter) corresponding to B (blue) placed in the line at the vertical direction center of the square array, and the second array pattern B has the same placement of the G filter as that of the first array pattern A and has the placement of the R filter and the placement of the B filter swapped over thereto.

Namely, the color filter 30 has the following features (1), (2), (3), (4) and (5).

Feature (1)

The color filter 30 illustrated in FIG. 2 includes the basic array pattern C formed from square placement patterns corresponding to 6×6 pixels, with the basic array pattern C disposed so as to repeat in both the horizontal direction and the vertical direction. Namely, the color filter array is an array in which each of the filters R, G, B (the R filter, G filter, B filter) has a specific periodicity.

Arraying the R filter, G filter and B filter thus with such a specific periodicity, enables processing to be performed in a repeating pattern such as during synchronization (interpolation) processing of R, G, B signals read from the color image pickup device.

Moreover, when images are reduced by thinning processing in basic array pattern C units, the color filter array of the thinning processed reduced image can be made similar to the color filter array prior to thinning processing, enabling a common processing circuit to be employed.

Feature (2)

The color filter 30 illustrated in FIG. 2 has the G filter, that corresponds to the color contributing the most to obtaining a brightness signal (the color G in the present exemplary embodiment), placed in each line in the horizontal direction, vertical direction and diagonal directions of the color filter array.

The G filter corresponding to the brightness system pixels are placed in every line in the horizontal direction, vertical direction and diagonal directions of the color filter array, thereby enabling the reproduction precision of synchronization processing to be raised in the high frequency region, irrespective of the high frequency direction.

Feature (3)

In the color filter 30 illustrated in FIG. 2, the R filter and B filter, that correspond to the two or more other colors than the G color (the R and B colors in the present exemplary embodiment), are placed in each line in the horizontal direction and vertical direction of the color filter array.

The R filter and B filter are placed in each line in the horizontal direction and vertical direction of the color filter array, thereby enabling color moire (false color) generation to be suppressed. Thus an optical low pass filter for suppressing false color generation may be omitted from placement on the optical path of the optical system from the incident face to the imaging plane. Moreover, even in cases in which an optical low pass filter is applied, one can be employed that has a weak action to cut the high frequency components to prevent false color generation, enabling deterioration of resolution to be avoided.

The basic array pattern C such as illustrated in FIG. 2 can be considered as an array of alternate first array pattern A and second array pattern B in the horizontal direction and vertical direction, wherein the first array pattern A is the 3×3 pixels surrounded by the frame of the broken line, and the second array pattern B is the 3×3 pixels surrounded by the frame of the single dot intermittent line.

The first array pattern A and the second array pattern B both have the G filters for the respective brightness system pixels placed at their 4 corners and center, so as to be placed along their two diagonals. Moreover, in the first array pattern A, the B filters are arrayed in the horizontal direction on each side of the central G filter, and the R filters are arrayed in the vertical direction. However, in the second array pattern B, the R filters are arrayed on each side of the central G filter in the horizontal direction, and the B filters are arrayed in the vertical direction. Namely, the first array pattern A and the second array pattern B have reverse positional relationships for the R filters and the B filters, but have the same placement otherwise.

Figure 16:
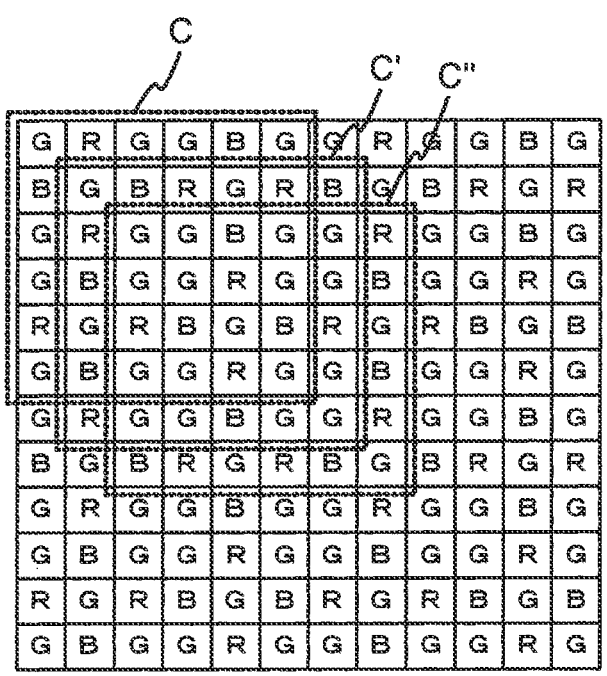
FIG. 16 is a diagram to explain the principles of a basic array pattern contained in a color filter.

Moreover, the G filters at the 4 corners of the first array pattern A and the second array pattern B configure G filters that are arrayed in a square array corresponding to 2×2 pixels by disposing the first array pattern A and the second array pattern B alternately along the horizontal and vertical directions as illustrated in FIG. 16.

Feature (4)

The color filter 30 illustrated in FIG. 2 contains a square array corresponding to 2×2 pixels formed from the G filters.

Figure 5:
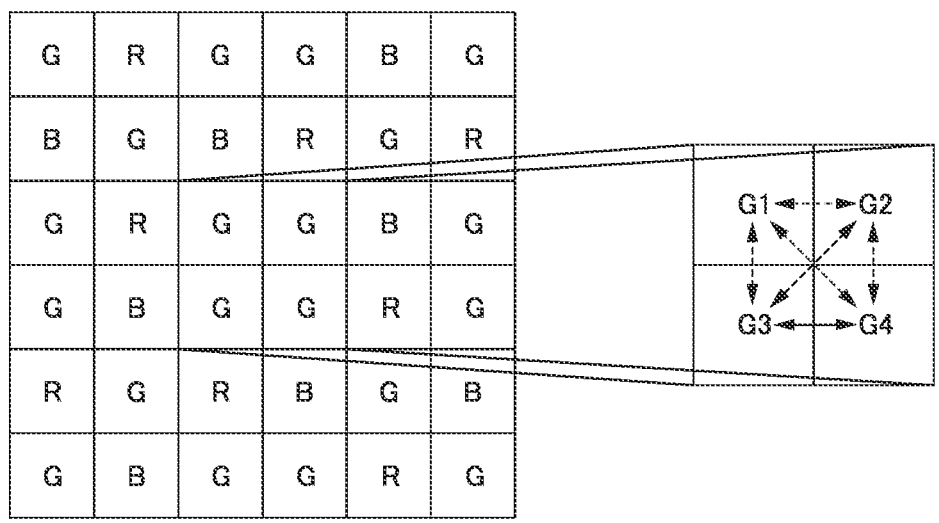
FIG. 5 is a diagram illustrating a 6×6 pixel basic array pattern contained in a color filter array of a color image pickup device of the first exemplary embodiment divided into 3×3 pixel arrays A and arrays B, and their placement.

As illustrated in FIG. 5, by extracting the 2×2 pixels formed from the G filters, and deriving the difference in absolute value of the pixel values of the G pixels in the horizontal direction, the difference in absolute value of the pixel values of the G pixels in the vertical direction, and the difference in absolute value of the pixel values of the G pixels in the diagonal directions (sloping up to the right and sloping up to the left), determination can be made that there is correlation in the direction with the smallest difference in absolute value out of the horizontal direction, vertical direction and diagonal directions.

Namely, according to the color filter array, the data of the G pixels with the smallest inter pixel separations are employed, thereby enabling determination of the direction with the highest correlation out of the horizontal direction, vertical direction and diagonal directions. The result of this directional determination can then be employed in interpolation processing from the peripheral pixels (synchronization processing).

Feature (5)

The basic array pattern C of the color filter 30 illustrated in FIG. 2 has point symmetry about the center of the basic array pattern C (the center of the 4 G filters). Moreover, as illustrated in FIG. 2, the first array pattern A and the second array pattern B inside the basic array pattern C also each have respective point symmetry about the G filters at their respective centers.

Such symmetry enables the circuit scale of a later stage processing circuit to be made smaller and to be simplified.

In the basic array pattern C as illustrated in FIG. 16, the color filter arrays of the first and third lines out of the first to sixth horizontal direction lines are GRGGBG, the color filter array of the second line is BGBRGR, the color filter arrays of the fourth and sixth lines are GBGGRG, and the color filter array of the fifth line is RGRBGB.

In FIG. 16, taking a shifted basic array pattern C' as the basic array pattern C shifted respectively by 1 pixel each in the horizontal direction and vertical direction, and a shifted basic array pattern C" shifted respectively by 2 pixels each, then the same color filter array results from repeatedly disposing the basic array pattern C', C" along the horizontal direction and vertical direction.

Namely, plural basic array patterns exist that enable configuration of the color filter array illustrated in FIG. 16 by repeatedly disposing basic array patterns in the horizontal direction and vertical direction. In the present exemplary embodiment, the basic array pattern C that is the basic array pattern with point symmetry is, for convenience, referred to as the basic array pattern.

Figure 3:
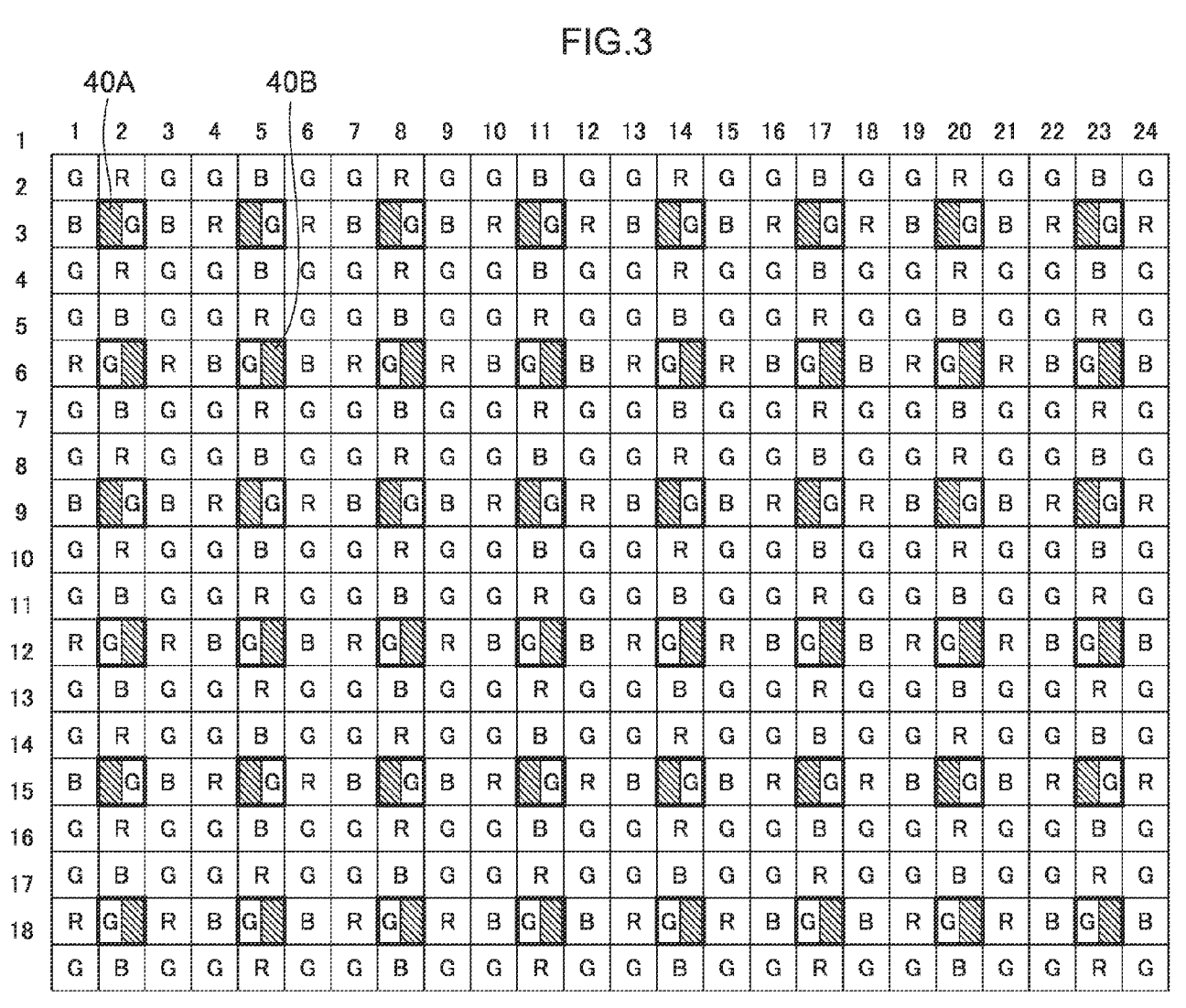

In order to perform AF control in the imaging apparatus 10 with what is referred to as a phase difference method, the image pickup device 14 has phase difference detection pixels placed in a predetermined pattern. Light-blocking portions 40 containing light-blocking films 40A that block light to the horizontal direction left half of a pixel, and light-blocking films 40B that block light to the horizontal direction right half of a pixel are formed on the phase difference detection pixels as illustrated in FIG. 3. In phase difference AF control, a phase shift amount is detected based on pixel data from the phase difference detection pixels provided with the light-blocking films 40A and based on pixel data from the phase difference detection pixels provided with the light-blocking films 40B. The focal position of the imaging lens is then adjusted based thereon.

In the present exemplary embodiment, as illustrated in FIG. 3, the light-blocking portions 40 are respectively provided on the phase difference detection pixels at the centers of 2 pairs of a first array pattern A and a second array pattern B, and are placed in all of the basic array patterns C. For example, when the pixel position of a position X in the horizontal direction and a position Y in the vertical direction is represented by (X, Y), in the top left basic array pattern C in FIG. 3, a light-blocking film 40A is provided to the phase difference detection pixel at (2, 2) and a light-blocking film 40B is provided to the phase difference detection pixel at (5, 5). Moreover, a light-blocking film 40A is provided to the phase difference detection pixel at (5, 2) and a light-blocking film 40B is provided to the phase difference detection pixel at (2, 5). Thus the light-blocking films 40A and the light-blocking films 40B are respectively formed on each of the phase difference detection pixels at the centers of the two pairs of first array pattern A and second array pattern B, as pairs of the first array pattern A and second array pattern B respectively disposed on the diagonals of the basic array pattern C. Such basic array patterns C are then disposed in rows in the horizontal direction and the vertical direction. Note that in FIG. 3 the light-blocking portions 40 are provided in all of the basic array patterns C, however there is no limitation thereto, and they may be provided only in the basic array patterns C within a specific region of a section of the image pickup device. This also applies to other exemplary embodiments below.

The light-blocking films 40A or the light-blocking films 40B are accordingly placed on the center pixels where the G filters are placed in the first array pattern A and the second array pattern B, with these pixels serving as the phase difference detection pixels. 4 individual G filters are placed at the periphery of these phase difference detection pixels. In cases in which pixel data of the phase difference detection pixels is employed in an image, the pixel data of the phase difference detection pixels needs to be interpolated from the peripheral pixels, however there are the 4 individual G filters placed at the periphery thereof. The interpolation precision can accordingly be raised in cases in which for example video image capture and still image capture is carried out while performing phase difference AF control.

The image capture processing section 16 subjects the image capture signals that have been output from the image pickup device 14 to predetermined processing, such as amplification processing and correlated double sampling, and A/D conversion processing, then outputs these as pixel data to the image processing section 20.

The image processing section 20 subjects the pixel data that has been output from the image capture processing section 16 to what is referred to as synchronization processing. Namely, for all the pixels, interpolation is performed of pixel data for colors other than the corresponding respective color from pixel data of peripheral pixels, so as to generate R, G, B pixel data for all pixels. Then, what is referred to as YC conversion processing is performed to the generated R, G, B pixel data, to generate brightness data Y and color difference data Cr, Cb. Then resizing processing is performed to re-size these signals to a size according to the image capture mode.

The drive section 22 performs for example driving to read image capture signals from the image pickup device 14 according to instruction from the controller 24.

The controller 24 performs overall control of the drive section 22 and the image processing section 20 according to the image capture mode. Although discussed in detail later, put briefly the controller 24 instructs the drive section 22 to read image capture signals with a reading method corresponding to the image capture mode, and instructs the image processing section 20 to perform image processing corresponding to the image capture mode.

Since, depending on the image capture mode, there is a need to read thinned image capture signals from the image pickup device 14, the controller 24 instructs the drive section 22 so as to thin and read image capture signals using a thinning method corresponding to the instructed image capture mode.

Included as image capture modes are a still image mode that captures still images, and video modes such as an HD video mode that thins the captured image and generates High Definition (HD) video data at a comparatively high definition and records this on a recording medium such as a memory card, not illustrated in the drawings, and a through video mode (live view mode) in which a captured image is thinned and a through video of comparatively low definition is output to a display section, not illustrated in the drawings.

Figure 4:
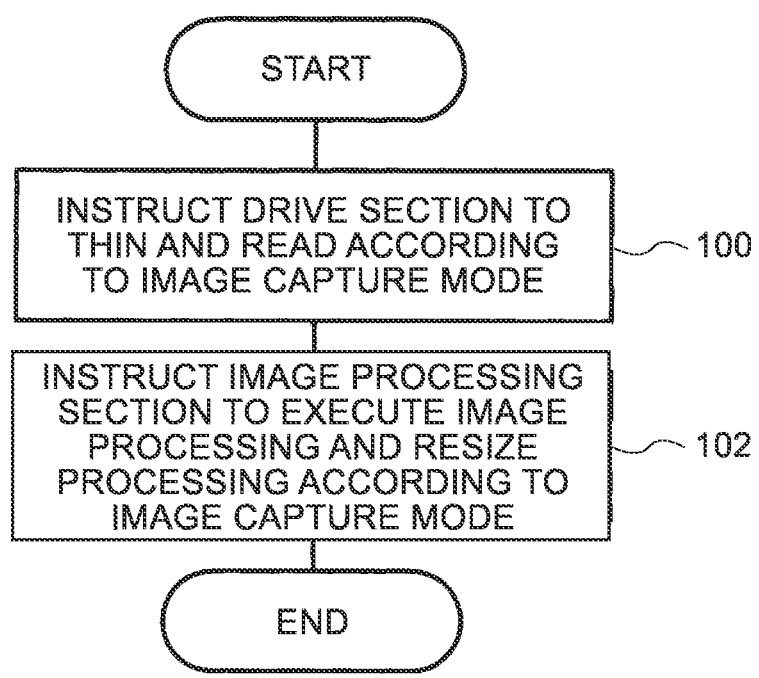
FIG. 4 is a flow chart of processing executed in a controller.

Explanation next follows of operation of the present exemplary embodiment, regarding processing executed by the controller 24, with reference to the flow chart of FIG. 4.

Note that the processing illustrated in FIG. 4 is executed when execution of imaging corresponding to the image capture mode is instructed.

First, at step 100, the drive section 22 is instructed to read pixel data by a thinning method corresponding to the image capture mode.

For example, for a video mode such as a HD video mode or through video mode, since video data is generated while performing phase difference AF control, at least some of the phase difference detection pixels provided with the light-blocking films 40A and the light-blocking films 40B are read, namely at least some of the lines provided with the light-blocking films 40A and the light-blocking films 40B out of the $(3n+2)^{th}$ vertical direction lines in FIG. 3 (wherein n=0, 1, 2, and so on), are read. Phase difference AF control is performed based on the pixel data of these lines, and other lines, namely at least some of the normal pixel lines, are also read and video data generated. During generation of this video data, interpolation is performed for the phase difference detection pixels from the pixel data of the normal pixels in their periphery.

As illustrated in FIG. 3, the phase difference detection pixels are placed on the pixels disposed with the G filters at the center of the first array patterns A and the second array patterns B, with 4 individual G filters placed at their periphery. The interpolation precision can accordingly be raised when pixel data for the phase difference detection pixels is interpolated from the peripheral pixels in cases in which for example video image capture and still image capture is carried out while performing phase difference AF control. Moreover, the filter disposed on the phase difference detection pixels is the filter corresponding to G to which the human eye is particularly sensitive, thereby enabling the precision of phase difference AF control to be raised.

At step 102, the image processing section 20 is instructed to execute image processing (synchronization processing and YC conversion processing) and resizing processing corresponding to the image capture mode.

Explanation next follows regarding processing contents of a synchronization processing circuit of the image processing section 20.

The image pickup device 14 is a single-chip color image pickup device and so the output image thereof is a RAW image (mosaic image), with the need to obtain a multi-channel image by interpolation processing (synchronization processing) of missing color pixels from pixels at their periphery. The issue here is in the regeneration characteristics of high frequency image signals.

Moreover, as illustrated in FIG. 3, the color filter 30 has the 2×2 G filters placed at the center of the basic array pattern C, and these pixels are normal pixels rather than phase difference detection pixels.

Thus in the present exemplary embodiment, when computing other color pixel values at pixel positions of pixels subject to synchronization processing extracted from the mosaic image, the brightness correlation direction is determined based on pixel data of G pixels that are normal pixels where the 2×2 G filter described above is placed, and the pixel values of the other color pixels can be estimated with good precision by employing the pixel values of the other color pixels present in the direction determined to be the correlation direction, thereby suppressing false color from occurring in high frequency portions. Specific explanation follows.

As illustrated in FIG. 5, G pixels of 2×2 pixels corresponding to G filters are extracted from a mosaic image output from the image pickup device 14, and when the pixel values of each of the G pixels are denoted G1, G2, G3, G4, in sequence from the top left to the bottom right, a direction determination circuit contained in the synchronization processing circuit computes the difference absolute values separately for each of the directions.

Namely, the vertical direction difference absolute value is $(|G1-G3|+|G2-G4|)/2$, the horizontal direction difference absolute value is $(|G1-G2|+|G3-G4|)/2$, the bottom left-top right diagonal direction difference absolute value is $(|G2-G3|)$, and the top left-bottom right diagonal direction difference absolute value is $(|G1-G4|)$.

The direction determination circuit then determines correlation (the correlation direction) as the direction having the smallest difference absolute value from out of these four correlation absolute values.

When, as illustrated in FIG. 6, a 5×5 pixel local region is extracted from the mosaic image such that the 3×3 pixel array B (see FIG. 2) is positioned at its center, there are 2×2 pixels of G pixels placed at the 4 corners of the 5×5 pixel local region. Consequently, when the 3×3 pixels of the array A inside the above local region are pixels subject to synchronization processing, the sums (or the average values) of the correlation absolute values of the 4 corners are derived separately for each direction, and the direction having the smallest value out of the sums (or the average values) of the correlation absolute values of the 4 corners for each of the directions is determined as the brightness correlation direction of the pixels subject to synchronization processing.

Figures 7A, 7B:
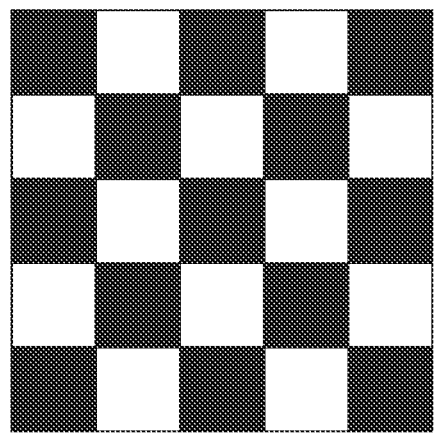
FIG. 7A is a diagram for explaining a correlation direction determination method for a case in which a diagonal high frequency image is incident to a color image pickup device.
FIG. 7B is a diagram for explaining a correlation direction determination method for a case in which a diagonal high frequency image is incident to a color image pickup device.

Moreover, when input with a pattern such as that illustrated in FIG. 7A (black=0, white=255), the vertical direction difference absolute value sum of the pixel values of the 4 corner 2×2 G pixels illustrated in FIG. 7B is $|0-255|\times 8=2040$, and the horizontal direction difference absolute value sum is also $|0-255|\times 8=2040$. However, the bottom left-top right diagonal direction difference absolute value sum is $|255-255|\times 2+|0-0|\times 2=0$, and the top left-bottom right diagonal direction difference absolute value sum is $|0-0|\times 2+|255-255|\times 2=0$. Consequently, the directions with the smallest difference absolute value sums are the 2 directions of the bottom left-top right diagonal direction and the top left-bottom right diagonal direction. However, since for the pattern of FIG. 7A input has a diagonal maximum frequency either of the diagonal directions may be employed without a problem arising.

Since the correlation direction is determined from the mutually adjacent 2×2 pixels of G pixels as described above, the correlation direction can be determined using the minimum pixel separation. Namely, the correlation direction can be determined with good precision without being influenced by high frequencies.

Explanation next follows regarding a synchronization processing method of a RGB mosaic image using the synchronization processing circuit of the image processing section 20.

When the correlation direction of the pixels subject to synchronization processing has been determined, the synchronization processing circuit then employs the pixel values of the other color pixels present in the determined correlation direction during computation of the other color pixel values of the pixel positions of the pixels subject to synchronization processing.

As illustrated in FIG. 3, since there are pixels of all the colors, R pixels, G pixels and B pixels, present in the horizontal direction and the vertical direction, when either the horizontal direction or the vertical direction is determined to be the correlation direction, the pixel values of other color pixels in the vicinity of the subject pixels present in the horizontal direction or the vertical direction are acquired. Then, the pixel value of one acquired pixel, or a value interpolated from pixel values of plural pixels, is taken as the other color pixel value for the pixel position of the subject pixel.

For example, when the horizontal direction is determined to be the correlation direction, in FIG. 6, the R pixel value at the pixel position of the G22 pixel is taken to be the unadjusted R12 or R32 pixel value, or determined by interpolation from the R12 and R32 pixel values.

Similarly, the B pixel value at the pixel position of the G22 pixel is taken to be the unadjusted B02 or B42 pixel value, or determined by interpolation from the B02 and B42 pixel values.

Moreover, the R pixel value at the pixel position of the B02 pixel is taken to be the unadjusted R12 pixel value, or determined by interpolation from the R12 and R32 pixel values.

Furthermore, the G pixel value at the pixel position of the B02 pixel is taken to be the unadjusted G22 pixel value, or determined by interpolation from the pixel value of the G pixel in the same horizontal position in the adjacent array B and the pixel value of the G22.

Note that the other color pixel values present in the vertical direction can be employed similarly to as described above in cases in which the vertical direction is determined to be the correlation direction.

Moreover, since in the filter array of the color filter 30 there are no pixels other than G pixels present in the inclined directions (diagonal directions) centered on the G pixels of the 3×3 pixels of the arrays A, in cases in which the correlation direction is determined to be a diagonal direction of continuous G pixels, the other color pixel values are computed by interpolating pixel values of subject pixels by computing color differences of pixel values of the R, B pixels in the vicinity of the G pixels.

As illustrated in FIG. 6, in a case in which the correlation direction is determined by a direction determination result to be on the top left-bottom right diagonal direction, there are no R or B pixels present in the interpolation direction of the G11 pixel. Accordingly, color difference of the pixel values R12, B21 of the R12, B21 pixels in the vicinity of the G11 pixel and the G pixel values G 12', G21' at these pixel positions are employed to interpolate a pixel value G11 at G11, and the R, B pixel values R11', B11' are computed at the pixel position of the G11 pixel.

Specifically, interpolation is performed according to the following equations.

$$R11' = G11 + (R12 - G12') \quad (a)$$

$$B11' = G11 + (B21 - G21') \quad (b)$$

In the equations (a) and (b) above, the G12'=G01, G21'=G10. Namely, the pixel values G12', G21' are G pixel values at pixel positions of the R12, B21 pixels estimated by top left-bottom right diagonal direction determination.

Similarly, the pixel values R22', B22' of the R, B pixels at the pixel position of the G22 pixel employ color differences between each of the pixel positions of the B21, B23 pixels and the R12, R32 pixels in the vicinity thereof to interpolate the pixel value G22 of G22, and compute the R, B pixel values R22', B22' at the pixel position of the G22 pixel.

Specifically, interpolation is performed according to the following equations.

$$R22' = G22 + \{(R12 + R32)/2 - (G12' + G32')/2\} \quad (c)$$

$$B22' = G22 + \{(B21 + B23)/2 - (G21' + G23')/2\} \quad (d)$$

Note that G32'=G43, G23'=G34.

When synchronization processing has been completed as described above for all of the 3×3 pixels (array B), similar processing to the above (direction determination and synchronization processing) is then performed for subject pixels of the adjacent 3×3 pixels (array A), with this repeated in movements of 3×3 pixel units.

As described above, with the color filter array of the color image pickup device 14, although for G pixels as the pixels subject to synchronization processing there are no pixels other than G pixels present in the diagonal direction during computation of the R, B pixel values at these pixel positions, depending on color filter array it is conceivable that for R pixels as the pixels subject to synchronization processing, there may be no G pixels or B pixels present in the diagonal direction during computation of the G, B pixel values at these pixel positions, or that for B pixels as the pixels subject to synchronization processing there may be no G pixels or R pixels present in the diagonal direction during computation of the G, R pixel values at these pixel positions.

Also in such cases, similarly to in the equations (a) to (d) above, the other color pixel values can be computed by interpolating the pixel values of subject pixels using color differences of the pixel values of pixels in the vicinity for which RGB pixel values have been computed.

The method for computing other color pixel values by interpolating the pixel values of subject pixels using color difference of pixels in the vicinity is as set out below.

In cases in which a pixel subject to synchronization processing is a G pixel and its pixel value is denoted G and there are no R or B pixels present in the correlation direction determined by the direction determination circuit, if the pixel values of the R, B pixels in the vicinity of the G pixel are denoted R, B, and the G pixel values at the pixel positions of these pixels are denoted GR, GB, then the R, B pixel values RG, BG at the position of the subject pixel are computed according to the following equations.

$$RG = G + (R - GR), BG = G + (B - GB) \quad \text{Equations (1)}$$

The Equations (1) correspond to the equations (a) and (b) described above.

Similarly, in cases in which the pixel subject to synchronization processing is an R pixel and its pixel value is denoted R and there are no G or B pixels present in the correlation direction determined by the direction determination circuit, if the pixel values of the G, B pixels in the vicinity of the R pixel are denoted G, B, and the R pixel values at the pixel positions of these pixels are denoted RG, RB, then the G, B pixel values GR, BR at the position of the subject pixel are computed according to the following equations.

$$GR=R+(G-RG), BR=R+(B-RB) \qquad \text{Equations (2)}$$

Moreover, in cases in which the pixel subject to synchronization processing is a B pixel and its pixel value is denoted B and there are no G or R pixels present in the correlation direction determined by the direction determination circuit, if the pixel values of the G, R pixels in the vicinity of the B pixel are denoted G, R, and the B pixel values at the pixel positions of these pixels are denoted BG, BR, then the G, R pixel values GB, RB at the position of the subject pixel are computed according to the following equations.

$$GB=B+(G-BG), RB=B+(R-BR) \qquad \text{Equations (3)}$$

Note that there is no limitation to the above equations (1) to (3), and in cases in which there are plural pixels of the same color as the color to be derived by interpolation present in the vicinity of the pixels subject to synchronization processing then, similarly to equations (c) to (d), interpolation may be performed by employing the average color difference of the plural pixels.

Moreover, in the present exemplary embodiment, although in cases in which there are no other color pixels present in the determined correlation direction for the pixels subject to synchronization processing the other color pixel values are computed by interpolation of the pixel values of the subject pixels using the color difference of other color pixels in the vicinity, there is no limitation thereto. Configuration may be made such that the other color pixel values are computed by interpolating the pixel values of the subject pixels by a color ratio of other color pixels in the vicinity.

A specific example is given below of a method for interpolating pixel values for a subject pixel to so at to compute the other color pixel values using a color ratio of pixels in the vicinity.

In cases in which a pixel subject to synchronization processing is a G pixel and its pixel value is denoted G and there are no R or B pixels present in the correlation direction determined by the direction determination circuit, if the pixel values of the R, B pixels in the vicinity of the G pixel are denoted R, B, and the G pixel values at the pixel positions of these pixels are denoted GR, GB, then the R, B pixel values RG, BG at the position of the subject pixel are computed according to the following equations.

$$RG=G\times(R/GR), BG=G\times(B/GB) \qquad \text{Equations (4)}$$

Similarly, in cases in which the pixel subject to synchronization processing is an R pixel and its pixel value is denoted R and there are no G or B pixels present in the correlation direction determined by the direction determination circuit, if the pixel values of the G, B pixels in the vicinity of the R pixel are denoted G, B, and the R pixel values at the pixel positions of these pixels are denoted RG, RB, then the G, B pixel values GR, BR at the position of the subject pixel are computed according to the following equations.

$$GR=R\times(G/RG), BR=R\times(B/RB) \qquad \text{Equations (5)}$$

Moreover, in cases in which the pixel subject to synchronization processing is a B pixel and its pixel value is denoted B and there are no G or R pixels present in the correlation direction determined by the direction determination circuit, if the pixel values of the G, R pixels in the vicinity of the B pixel are denoted G, R, and the B pixel values at the pixel positions of these pixels are denoted BG, BR, then the G, R pixel values GB, RB at the position of the subject pixel are computed according to the following equations.

$$GB=B\times(G/BG), RB=B\times(R/BR) \qquad \text{Equations (6)}$$

Moreover, when the difference absolute values of the pixel values of the G pixels adjacent in the horizontal, vertical or diagonal (bottom left-top right, top left-bottom right) directions are substantially equal to each other (when the difference absolute values are 0 or substantially 0 in all directions), the direction determination circuit determines that there is no correlation direction. In such cases, the other color pixel values at the pixel positions of the pixels subject to synchronization processing employ the pixel values of the other color pixels present in the vicinity of these pixel positions.

Note that the controller 24 may be configured with a computer that includes a CPU, ROM, RAM and non-volatile ROM. In such cases a processing program for the above processing may, for example, be pre-stored on the non-volatile ROM, and then executed by reading into the CPU.

Figure 8A:
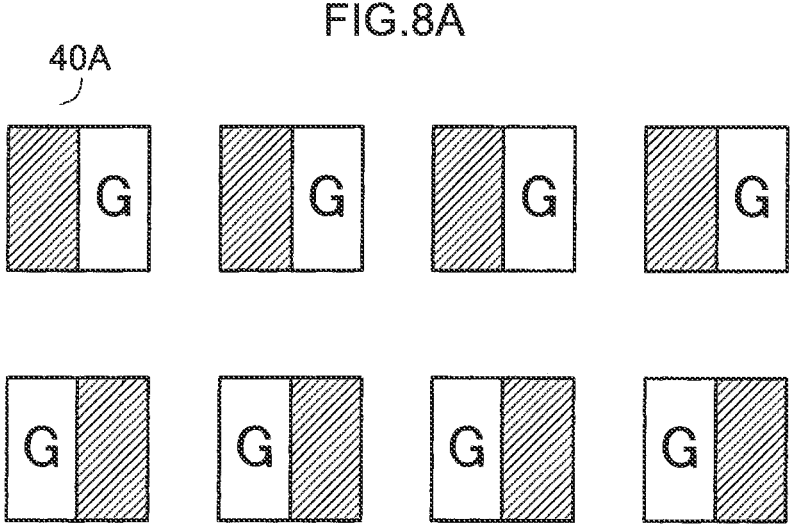
FIG. 8A is a diagram to explain a placement pattern of light-blocking film.
Figure 8B:
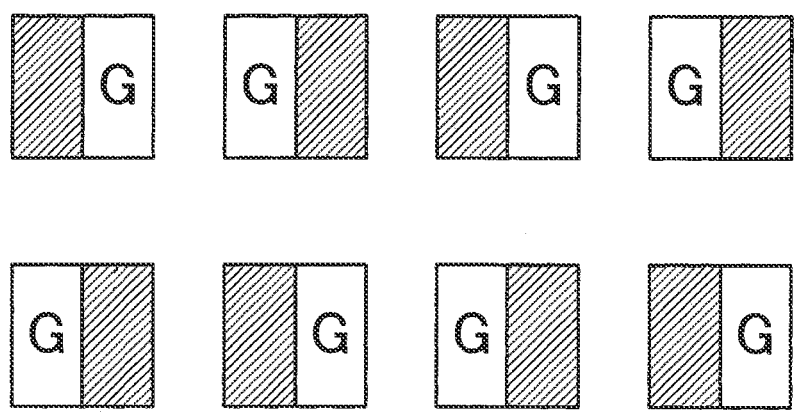
FIG. 8B is a diagram to explain a placement pattern of light-blocking film.

Note that in the present exemplary embodiment, as illustrated in FIG. 3, 8A, explanation is given of a case in which horizontal direction array lines placed with the light-blocking films 40A are alternately disposed in the vertical direction with horizontal direction array lines placed with the light-blocking films 40B. However, as illustrated in FIG. 8B, configuration may be made with array lines of the light-blocking films 40A and the light-blocking films 40B alternately placed in this sequence along the horizontal direction, alternately disposed in the vertical direction with array lines of the light-blocking films 40B and the light-blocking films 40A alternately placed in this sequence along the horizontal direction. Note that only the phase difference detection pixels are illustrated in FIG. 8A and FIG. 8B. In the placement illustrated in FIG. 8B, since this results in diagonal placement of both the light-blocking films 40A and the light-blocking films 40B, it is possible to focus with good precision when for example capturing an image of a subject that contains diagonal lines. This also applies in the following exemplary embodiments.

Second Exemplary Embodiment

Explanation next follows regarding a second exemplary embodiment of the present invention. Note that the same reference numerals are allocated to portions similar to those of the first exemplary embodiment, and detailed explanation thereof is omitted.

Figure 9:
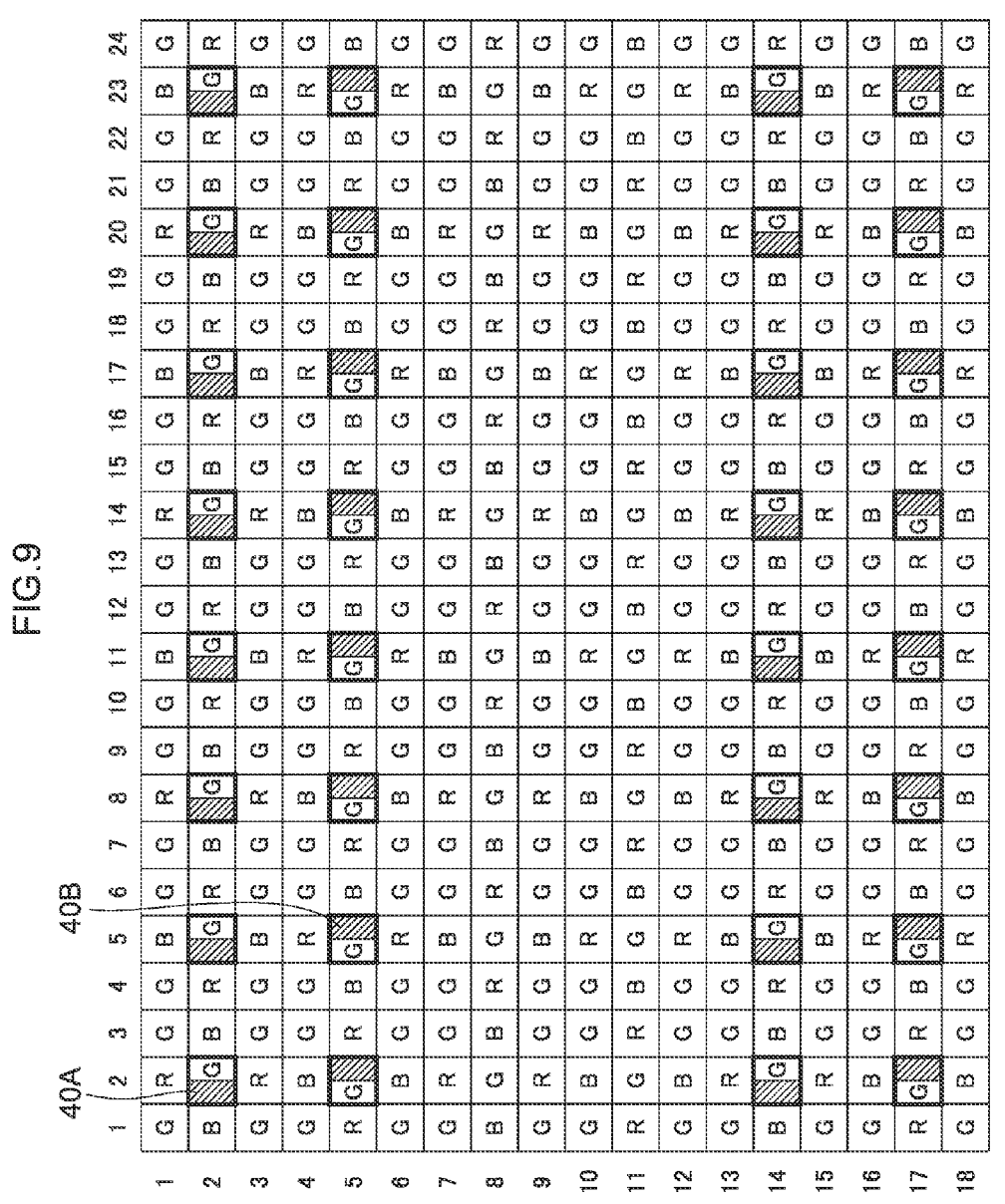

FIG. 9 illustrates a placement of light-blocking films 40A, 40B according to the present exemplary embodiment. A point of difference of the present exemplary embodiment to the first exemplary embodiment is the placement of the light-blocking films 40A, 40B.

As illustrated in FIG. 9, in the present exemplary embodiment the light-blocking portions 40 are respectively provided on the phase difference detection pixels at the center of 2 pairs a first array pattern A and a second array pattern B that configure a basic array pattern C, with horizontal direction array lines of the first array pattern A and the second array pattern B that are placed with the light-blocking portions 40 alternating in the vertical direction with horizontal direction array lines of the first array pattern A and the second array pattern B that are not placed with the light-blocking portions 40. Namely, in the example illustrated in FIG. 9, the light-blocking films 40A, 40B are placed in the vertical direction $(2n+1)^{th}$ lines of the basic array patterns C, and the light-blocking films 40A, 40B are not placed in the $(2n+2)^{th}$ lines of the basic array patterns C.

In such cases, when the image capture mode is a video mode, the controller 24 reads pixel data of the phase difference detection pixels placed with the light-blocking films 40A, 40B in the vertical direction $(2n+1)^{th}$ lines of the basic array patterns C and performs phase difference AF control, and also reads pixel data of normal pixels in the vertical direction $(2n+2)^{th}$ lines of the basic array patterns C and generates video data.

Thus in the present exemplary embodiment, the pixel data from the phase difference detection pixels is only employed for phase difference AF control, and is not used in generating video data and so there is no need for interpolation from the peripheral pixels. Moreover, the video data is generated from pixel data of normal pixels. Thus the processing speed for phase difference AF control can be raised in comparison to cases in which the phase difference detection pixels are generated based on video data. Moreover, the processing speed for video data generation can be raised in comparison to cases in which interpolated video data is generated.

Third Exemplary Embodiment

Explanation next follows regarding a third exemplary embodiment of the present invention. Note that the same reference numerals are allocated to portions similar to those of the above exemplary embodiment, and detailed description thereof is omitted.

Figure 10:
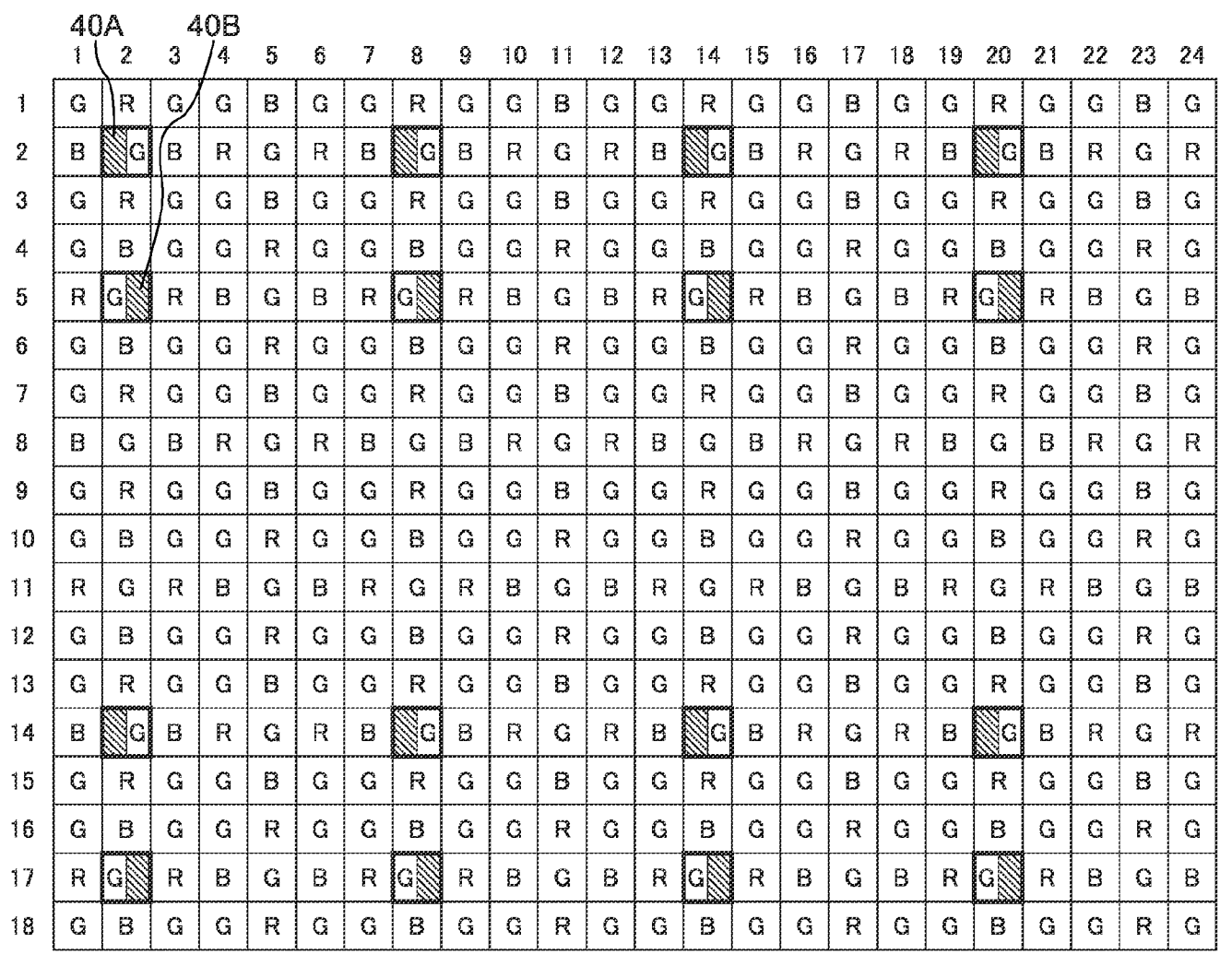

FIG. 10 illustrates a placement of light-blocking films 40A, 40B according to the present exemplary embodiment. A point of difference of the present exemplary embodiment to the first exemplary embodiment is the placement of the light-blocking films 40A, 40B. Thinning driving is similar to that of the second exemplary embodiment.

As illustrated in FIG. 10, in the present exemplary embodiment the light-blocking portions 40 are provided on the phase difference detection pixels at the center of a first array pattern A and a second array pattern B on one horizontal direction side out of two pairs of the array pattern A and the second array pattern B that configure a basic array pattern C, with horizontal direction array lines of the first array patterns A and the second array patterns B that are placed with the light-blocking portions 40 disposed alternately in the vertical direction with horizontal direction array lines of the first array patterns A and the second array patterns B that are not placed with the light-blocking portions 40. Namely, in the example illustrated in FIG. 10, the light-blocking films 40A, 40B are placed in the vertical direction $(2n+1)^{th}$ lines of the basic array patterns C, and the light-blocking films 40B are not placed in the $(2n+2)^{th}$ lines of the basic array patterns C. Moreover, the light-blocking films 40A, 40B are placed at every $6^{th}$ pixel in the horizontal direction. Namely, the light-blocking films 40A, 40B are placed in the $(6m+2)^{th}$ horizontal direction lines (m=0, 1, 2, and so on).

Therefore, since the normal pixels at the periphery of the phase difference detection pixels are increased in comparison to the second exemplary embodiment, the precision of interpolation can be raised, enabling image quality to be raised.

Fourth Exemplary Embodiment

Explanation next follows regarding a fourth exemplary embodiment of the present invention. Note that the same reference numerals are allocated to portions similar to those of the above exemplary embodiments, and detailed explanation thereof is omitted.

Figure 11:
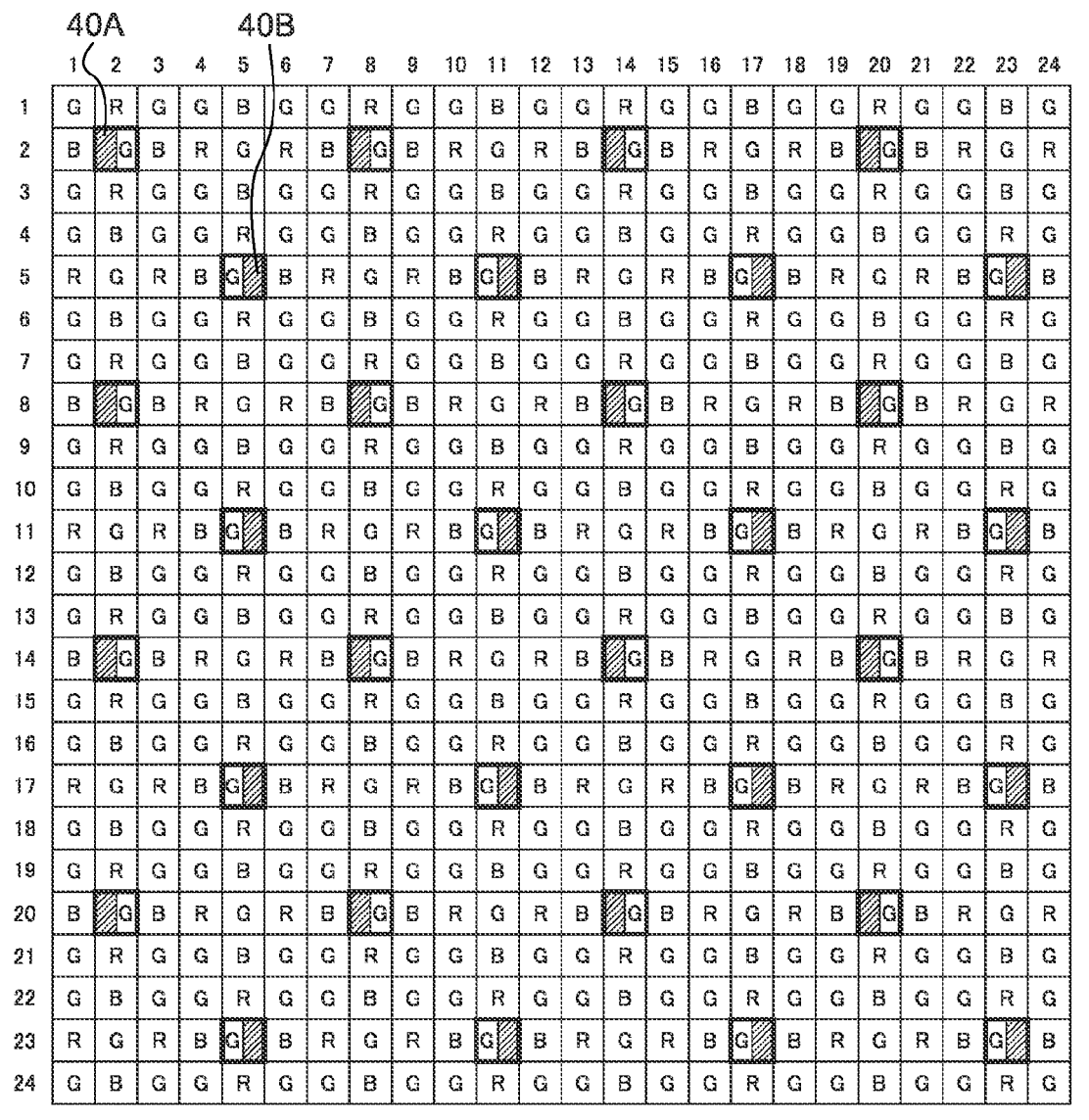

FIG. 11 illustrates a placement of light-blocking films 40A, 40B according to the present exemplary embodiment. A point of difference of the present exemplary embodiment to the above exemplary embodiment is the placement of the light-blocking films 40A, 40B. Thinning driving is similar to that of the first exemplary embodiment.

As illustrated in FIG. 11, in the present exemplary embodiment the light-blocking portions 40 are provided on the phase difference detection pixels at the centers of 2 first array patterns A disposed on one diagonal of a basic array pattern C, and are placed in all the basic array patterns.

In such cases, in video mode, in cases such as when video data is displayed while performing phase difference AF control, interpolation is performed for the phase difference detection pixels from peripheral pixels and video data is generated.

There are however occasions when, in horizontal direction adjacent pixels, color mixing arises due to light leaking in from the adjacent pixels. To address this, in the present exemplary embodiment, as illustrated in FIG. 11, the horizontal direction adjacent pixel on the side provided with the light-blocking film 40A of the phase difference detection pixels where the light-blocking films 40A are provided and the horizontal direction adjacent pixel on the side provided with the light-blocking film 40B of the phase difference detection pixels where the light-blocking films 40B are provided are both the same as each other, namely B pixels. The influence from color mixing can accordingly be cancelled out, and the image quality can be raised compared to cases in which the horizontal direction adjacent pixel on the side provided with the light-blocking film 40A of the phase difference detection pixels where the light-blocking films 40A are provided and the horizontal direction adjacent pixel on the side provided with the light-blocking film 40B of the phase difference detection pixels where the light-blocking films 40B are provided are not the same as each other.

Note that as illustrated in FIG. 12, the light-blocking portions 40 may be made with provision on the phase difference detection pixels at the center of the 2 second array patterns B disposed on the other diagonal of the basic array pattern C, and are placed in all the basic array patterns. In such cases, the horizontal direction adjacent pixel on the side provided with the light-blocking film 40A of the phase difference detection pixels where the light-blocking films 40A are provided and the horizontal direction adjacent pixel on the side provided with the light-blocking film 40B of the phase difference detection pixels where the light-blocking films 40B are provided are both the same as each other, namely R pixels. Since the wavelength of R is particularly susceptible to being incident to the adjacent pixels, color mixing can be even more efficiently prevented, enabling the image quality to be raised.

Fifth Exemplary Embodiment

Explanation next follows regarding a fifth exemplary embodiment of the present invention. Note that the same reference numerals are allocated to portions similar to those of the above exemplary embodiments, and detailed explanation thereof is omitted.

Figure 13:
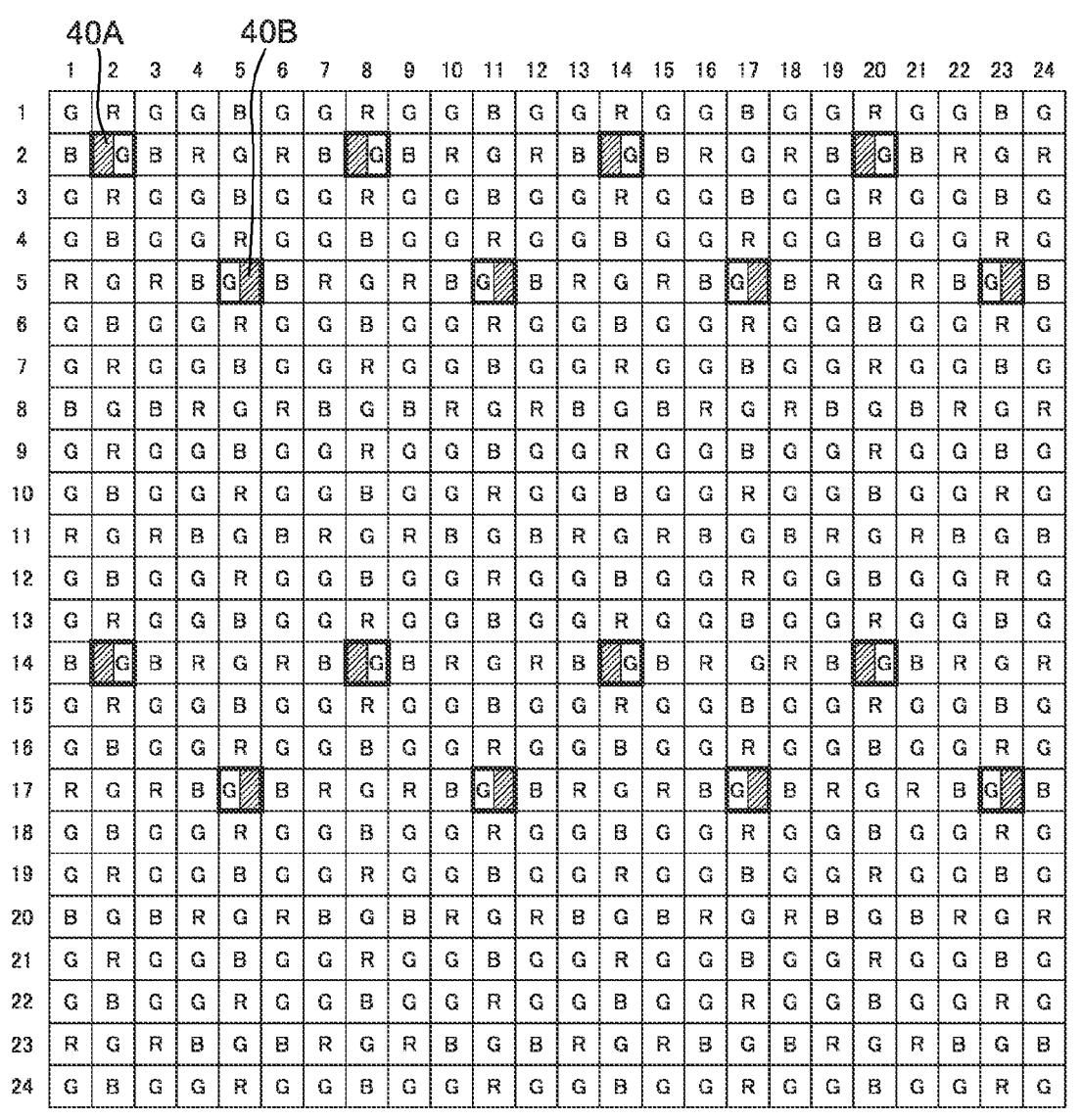

FIG. 13 illustrates a placement of the light-blocking films 40A, 40B according to the present exemplary embodiment. A point of difference of the present exemplary embodiment to the above exemplary embodiment is the placement of the light-blocking films 40A, 40B. The thinning driving is similar to that of the second and third exemplary embodiments.

As illustrated in FIG. 13, in the present exemplary embodiment the light-blocking portions 40 are respectively provided on the phase difference detection pixels at the centers of 2 first array patterns A that are disposed on one of the diagonals of a basic array pattern C, with horizontal direction array lines of the basic array patterns C that are placed with the light-blocking portions 40 arrayed alternating in the vertical direction with horizontal direction array lines of the basic array patterns C that are not placed with the light-blocking portions 40.

Thus in the present exemplary embodiment, the horizontal direction adjacent pixel on the side provided with the light-blocking film 40A of the phase difference detection pixels where the light-blocking films 40A are provided and the horizontal direction adjacent pixel on the side provided with the light-blocking film 40B of the phase difference detection pixels where the light-blocking films 40B are provided are both the same as each other, namely B pixels. The influence from color mixing can accordingly be cancelled out, and the image quality can be raised compared to cases in which the horizontal direction adjacent pixel on the side provided with the light-blocking film 40A of the phase difference detection pixels where the light-blocking films 40A are provided and the horizontal direction adjacent pixel on the side provided with the light-blocking film 40B of the phase difference detection pixels where the light-blocking films 40B are not the same as each other.

In such cases, when the image capture mode is a video mode, the controller 24 reads pixel data of the phase difference detection pixels placed with the light-blocking films 40A, 40B in the vertical direction $(2n+1)^{th}$ lines of the basic array patterns C to perform phase difference AF control, and also reads pixel data of normal pixels in the vertical direction $(2n+2)^{th}$ lines of the basic array patterns C to generate video data.

Thus the pixel data from the phase difference detection pixels is only employed for phase difference AF control, and is not used in generating video data and so the there is no need for interpolation from the peripheral pixels. Moreover, the video data is generated from pixel data of normal pixels. Thus the processing speed for phase difference AF control can be raised in comparison to cases in which the phase difference detection pixels are based on video data generation. Moreover, the processing speed for video data generation can be raised in comparison to cases in which video data is generated by interpolation.

Note that, as illustrated in FIG. 14, the light-blocking portions 40 may be made such respective provision is made on the phase difference detection pixels at the centers of 2 second array patterns B that are disposed on the other of the diagonals, with horizontal direction array lines of the basic array patterns C that are placed with the light-blocking portions 40 arrayed alternating in the vertical direction with horizontal direction array lines of the basic array patterns C that are not placed with the light-blocking portions 40.

In such cases, the horizontal direction adjacent pixel on the side provided with the light-blocking film 40A of the phase difference detection pixels where the light-blocking films 40A are provided and the horizontal direction adjacent pixel on the side provided with the light-blocking film 40B of the phase difference detection pixels where the light-blocking films 40B are provided are both the same as each other, namely R pixels. Since the wavelength of R is particularly susceptible to being incident to the adjacent pixels, color mixing can be even more efficiently prevented, enabling the image quality to be raised.

Moreover, in each of the above exemplary embodiments, explanation has been given of examples of color filter arrays with the 3 primary color RGB color filters, however the types of color filter are not limited thereto.

Moreover, in each of the above exemplary embodiments, explanation has been given of configurations in which the phase difference detection pixels are provided with the light-blocking films 40A that block light to the horizontal direction left half of pixels or the light-blocking films 40B that block light to the horizontal direction right half of pixels, however there is no limitation to these light-blocking regions, as long as the light-blocking films 40A block light to a region that is a part of the phase difference detection pixels and let light through to other regions, and the light-blocking films 40B block light to part of the phase difference detection pixels and let light pass through in a region that forms a pair with the light-pass region of the light-blocking films 40A.

Figure 15:
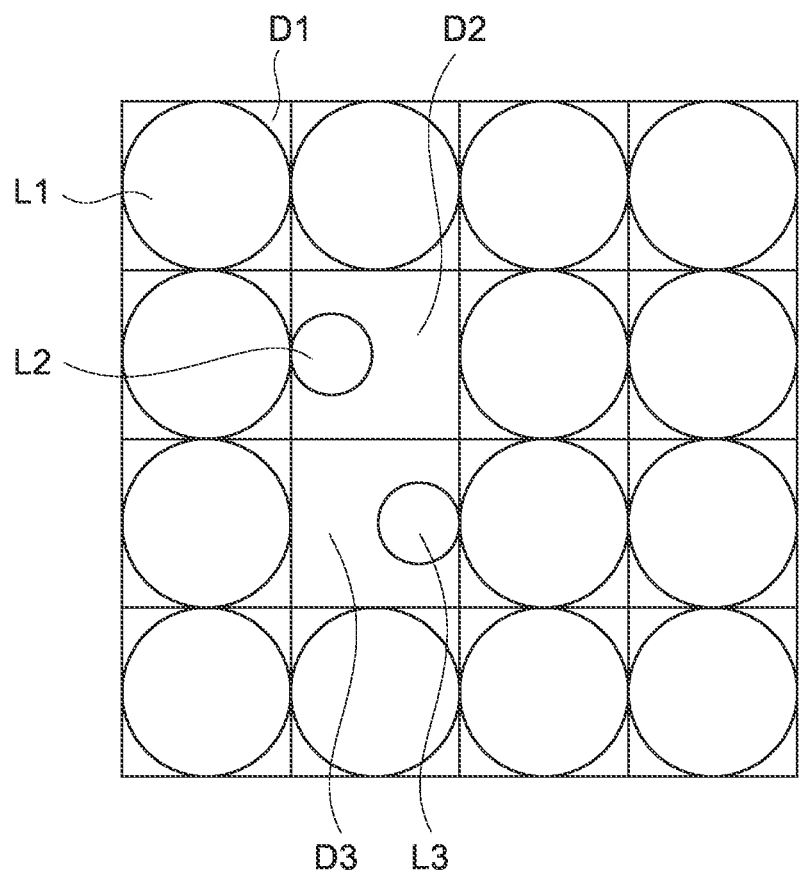
FIG. 15 is a diagram to explain a modified example of phase difference detection pixels.

Moreover, in each of the above exemplary embodiments, explanation has been given of a configuration in which the light-blocking films are provided on the phase difference detection pixels, however there is no limitation thereto. For example, the phase difference detection pixels may be formed by adopting the configuration described in Japanese Patent Application 2009-227338 incorporated by reference herein. Namely, a configuration in which an image pickup device is configured by top microlenses, inner microlenses, and the light receiving elements of similar shape, configured to include first pixels D1 that receive light rays that have passed through the entire region of the imaging lens eye, second pixels D2 that receive only light rays that passed through a portion of a half region of the imaging lens eye, and third pixels D3 that receive only light rays that have passed through a portion of a half region of the imaging lens eye that is different to the second pixels D2. Then, as illustrated in FIG. 15, top microlenses L2, L3 are disposed on the second pixels D2 and the third pixels D3, the top microlenses L2, L3 having a smaller diameter than top microlenses L1 for the first pixels D1 and being respectively shifted in different directions with respect to the optical axes of the inner microlenses. The top microlenses and the light receiving elements are disposed shifted with respect to each other. The second pixels D2 and the third pixels D3 can accordingly be formed in this manner as the phase difference detection pixels. The present invention is also applicable to such a configuration. Moreover, depending on the configuration of the image pickup device, an embodiment may also be implemented without provision of the inner lenses. Moreover, the configuration of the phase difference pixels is not limited to the configuration described above, and it is possible to substitute any configuration capable of partitioning the eye.

Sixth Exemplary Embodiment

Explanation next follows regarding a sixth exemplary embodiment of the present invention.

Since phase difference detection pixels have a lower sensitivity than normal pixels, and their characteristics are also differ, there is a need to correct the pixel data from phase difference detection pixels when the pixel data of the phase difference detection pixels is employed as imaging data for a still image or a video image. Explanation follows regarding a pixel data correction method for phase difference detection pixels in the present exemplary embodiment.

As correction methods, two types of method are known, average value correction and gain correction, and either may be employed. Average value correction is a method in which an average value of the pixel values of normal pixels at the periphery of the phase difference detection pixels is taken as pixel data for these phase difference detection pixels. Gain correction is a method by which pixel data for the phase difference detection pixels is raised by multiplying pixel data for the phase difference detection pixels by a specific gain equivalent to the difference in level between the normal pixels and the phase difference detection pixels.

Specific explanation follows regarding a case in which pixel data of phase difference detection pixels is corrected by average value correction.

Figure 17:
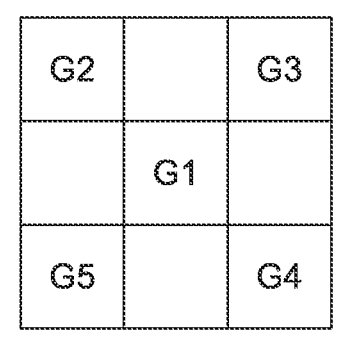

FIG. 17 illustrates a placement of G pixels in 3×3 pixels that are centered on a G pixel at the center of an array A and an array B. In FIG. 17 the G pixel at the center is G1, and the G pixels at the periphery thereof are respectively G2, G3, G4, G5, clockwise from the top left.

As illustrated in FIG. 3, and FIG. 9 to FIG. 14, the phase difference detection pixels are each placed at the G1 pixel of FIG. 17.

Consequently, when the pixel data of the G1 pixel that is a phase difference detection pixel is employed as image data, the average value of the pixel data of each of the G2, G3, G4 and G5 pixels that are normal pixels at the periphery thereof is taken as the pixel data for the G1 pixel.

Average value correction for the pixel data of phase difference detection pixels is accordingly performed as above based on the pixel data of the peripheral normal pixels.

Note that whether a better image is obtained by performing gain correction or average value correction sometimes differs depending on the contents of the captured image. Consequently, use of gain correction or average value correction may be chosen according to the contents of the captured image.

What is claimed is:

1. A color image pickup device comprising:
   an image pickup device comprising a plurality of photoelectric conversion elements arrayed in a horizontal direction and a vertical direction;
   a color filter that is provided above a plurality of pixels configured by the plurality of photoelectric conversion elements, the color filter having repeatedly disposed 6×6 pixel basic array patterns configured with a first array pattern and a second array pattern disposed symmetrically about a point, wherein the first array pattern has a first filter corresponding to a first color that contributes most to obtaining a brightness signal placed at the 4 corner and center pixels of a 3×3 pixel square array, a second filter corresponding to a second color different from the first color placed in a line at the horizontal direction center of the square array, and a third filter corresponding to a third color different from the first color and the second color placed in a line at the vertical direction center of the square array, and the second array pattern has the same placement of the first filter as that in the first array pattern and has the placement of the second filter and the placement of the third filter swapped over to that of the first array pattern; and
   phase difference detection pixels that are placed on the pixels corresponding to the positions of the centers of at least 1 pair of patterns out of 2 pairs of the first array pattern and the second array pattern configuring the basic array pattern.

2. The color image pickup device of claim 1, wherein a light-blocking section is provided on the phase difference detection pixels, the light-blocking section comprising a first light-blocking film to block light to a region that is a part of the pixel and to let light through to other regions or a second light-blocking film to block light to part of the pixel and to let light pass through in a region that forms a pair with the light-pass region of the first light-blocking film.

3. The color image pickup device of claim 2, wherein the first light-blocking film of the light-blocking section blocks light to a pixel horizontal direction left half region, and the second light-blocking film blocks light to a pixel horizontal direction right half region.

4. The color image pickup device of any one of claim 1, wherein the phase difference detection pixels are respectively provided to pixels corresponding to the positions of the centers of the 2 pairs of the first array pattern and the second array pattern, and the phase difference detection pixels are placed on pixels corresponding to the positions of the centers of all the basic array patterns in at least a specific region of the image pickup device.

5. The color image pickup device of claim 1, wherein the phase difference detection pixels are respectively provided to pixels corresponding to the positions of the centers of the 2 pairs of the first array pattern and the second array pattern, and horizontal direction array lines disposed with the first array patterns and the second array patterns that are placed with the phase difference detection pixels are alternately arrayed in the vertical direction with horizontal direction array lines disposed with the first array patterns and the second array patterns that are not placed with the phase difference detection pixels.

6. The color image pickup device of claim 1, wherein the phase difference detection pixels are respectively provided to pixels corresponding to the positions of the centers of 1 pair of the first array pattern and the second array pattern on one horizontal direction side of the 2 pairs of the first array pattern and the second array pattern, and horizontal direction array lines disposed with the first array patterns and the second array patterns that are placed with the phase difference detection pixels are alternately arrayed in the vertical direction with horizontal direction array lines disposed with the first array patterns and the second array patterns that are not placed with the phase difference detection pixels.

7. The color image pickup device of claim 1, wherein the phase difference detection pixels are respectively provided to pixels corresponding to the positions of the centers of 2 array patterns disposed on one of the diagonals out of the 2 first array patterns disposed on one diagonal of the basic array pattern and the 2 second array patterns disposed on the other diagonal of the basic array pattern, and are placed on pixels corresponding to the positions of the centers of all the basic array patterns in at least a specific region of the image pickup device.

8. The color image pickup device of claim 1, wherein the phase difference detection pixels are respectively provided to pixels corresponding to the positions of the centers of 2 array patterns disposed on one of the diagonals out of the 2 first array patterns disposed on one diagonal of the basic array pattern and the 2 second array patterns disposed on the other diagonal of the basic array pattern, and horizontal direction array lines disposed with the basic array patterns that are placed with the phase difference detection pixels are alternately arrayed in the vertical direction with horizontal direction array lines disposed with the basic array patterns that are not placed with the phase difference detection pixels.

9. The color image pickup device of claim 2, wherein array lines disposed in the horizontal direction with the first light-blocking film are alternately arrayed in the vertical direction with array lines disposed in the horizontal direction with the second light-blocking film.

10. The color image pickup device of claim 2, wherein array lines alternately disposed in the horizontal direction in sequence with the first light-blocking film and the second light-blocking film are alternately arrayed in the vertical direction with array lines alternately disposed in the horizontal direction in sequence with the second light-blocking film and the first light-blocking film.

11. The color image pickup device of claim 3, wherein:
the first color is green (G), the second color is red (R), and the third color is blue (B); and
the light-blocking section is disposed such that the pixel on the horizontal direction left side of the first light-blocking film and the pixel on the horizontal direction right side of the second light-blocking film are both red (R) color pixels.

12. The color image pickup device of any one of claim 1, wherein the first color is green (G), the second color is one color of red (R) or blue (B), and the third color is the other color of red (R) or blue (B).

13. An imaging apparatus comprising:
the color image pickup device of claim 1;
a drive section that drives the color image pickup device so as to read phase difference detection pixel data from the phase difference detection pixels; and
a focus adjustment section that adjusts focus based on the phase difference detection pixel data.

14. An imaging apparatus comprising:
the color image pickup device of claim 5;
a drive section that drives the color image pickup device so as to read phase difference detection pixel data from the phase difference detection pixels and so as to read video generation pixel data from normal pixels other than the phase difference detection pixels;
a focus adjustment section that adjusts focus based on the phase difference detection pixel data; and
a generation section that generates video data based on the video generation pixel data.

15. An imaging apparatus comprising:
the color image pickup device of claim 6;
a drive section that drives the color image pickup device so as to read phase difference detection pixel data from the phase difference detection pixels and so as to read video generation pixel data from normal pixels other than the phase difference detection pixels;
a focus adjustment section that adjusts focus based on the phase difference detection pixel data; and
a generation section that generates video data based on the video generation pixel data.

16. An imaging apparatus comprising:
the color image pickup device of claim 8;
a drive section that drives the color image pickup device so as to read phase difference detection pixel data from the phase difference detection pixels and so as to read video generation pixel data from normal pixels other than the phase difference detection pixels;
a focus adjustment section that adjusts focus based on the phase difference detection pixel data; and
a generation section that generates video data based on the video generation pixel data.

17. An imaging apparatus comprising:
the color image pickup device of claim 1;
a drive section that drives the color image pickup device so as to read pixel data of direction determination pixels placed with a 2×2 first filter at the center of the basic array pattern;
a detection section that detects a brightness correlation direction based on the pixel data read from the direction determination pixels; and
an interpolation section that, based on the detected correlation direction, interpolates pixel data of a color other than the corresponding color for each pixel from pixel data of peripheral pixels.

18. A non-transitory storage medium storing an image capture program that causes a computer to execute processing function as each section configuring the imaging apparatus of claim 13.

19. A non-transitory storage medium storing an image capture program that causes a computer to execute processing function as each section configuring the imaging apparatus of claim 14.

20. A non-transitory storage medium storing an image capture program that causes a computer to execute processing function as each section configuring the imaging apparatus of claim 15.

21. A non-transitory storage medium storing an image capture program that causes a computer to execute processing function as each section configuring the imaging apparatus of claim 16.

22. A non-transitory storage medium storing an image capture program that causes a computer to execute processing function as each section configuring the imaging apparatus of claim 17.

* * * * *